(12) United States Patent
Combs et al.

(10) Patent No.: US 9,090,045 B2
(45) Date of Patent: Jul. 28, 2015

(54) ENGINEERED WOOD PRODUCED WITH SUBSTITUTED CELLULOSE ESTER ADHESIVES AND METHODS RELATING THERETO

(71) Applicant: Celanese Acetate LLC, Irving, TX (US)

(72) Inventors: Michael Combs, Shady Spring, WV (US); Thomas Garrett, Narrows, VA (US); Chad Prunesti, Lindside, WV (US); Martin Jakob, Frankfurt (DE); Yi (Julie) Li, Blacksburg, VA (US); Xiaoyan Tu, Blacksburg, VA (US)

(73) Assignee: Celanese Acetate LLC, Irving, TX (US)

( * ) Notice: Subject to any disclaimer, the term of this patent is extended or adjusted under 35 U.S.C. 154(b) by 0 days.

(21) Appl. No.: 13/985,362

(22) PCT Filed: Sep. 24, 2012

(86) PCT No.: PCT/US2012/056826
§ 371 (c)(1),
(2) Date: Aug. 14, 2013

(87) PCT Pub. No.: WO2014/046681
PCT Pub. Date: Mar. 27, 2014

(65) Prior Publication Data
US 2014/0087122 A1  Mar. 27, 2014

(51) Int. Cl.
*B32B 7/12* (2006.01)
*C08L 97/02* (2006.01)
(Continued)

(52) U.S. Cl.
CPC ............... *B32B 7/12* (2013.01); *B32B 21/042* (2013.01); *B32B 21/13* (2013.01); *B32B 23/044* (2013.01);
(Continued)

(58) Field of Classification Search
CPC ............. C08L 1/20; C08B 7/00; B32B 23/20; C09J 101/00; C09J 101/02; C09J 101/08
USPC ............................... 428/106; 536/58; 156/328
See application file for complete search history.

(56) References Cited

U.S. PATENT DOCUMENTS 2,036,423 A * 4/1936 Malm et al. .................... 536/59
2,639,234 A   5/1953 Morey et al.
(Continued)

FOREIGN PATENT DOCUMENTS

EP   0488665 A1   6/1992
EP   0934918 A1   8/1999
(Continued)

OTHER PUBLICATIONS

Puls et al., "Degradation of Cellulose Acetate-Based Materials: A Review," J. Polym Environ (2011) 19: 152-165.
(Continued)

*Primary Examiner* — Aaron Austin
*Assistant Examiner* — Jasper Saberi
(74) *Attorney, Agent, or Firm* — McDermott Will & Emery LLP; Jaimes Sher (57) ABSTRACT

Engineered wood may be produced with substituted cellulose ester adhesives. For example, an engineered wood may comprise a plurality of wood substrates that independently comprise a lignin-containing material (e.g., wood dust, wood particles, wood chips, and the like), the plurality of wood substrates being adhered together with an adhesive that comprises a substituted cellulose ester that comprises a cellulose polymer backbone having an organic ester substituent and an inorganic ester substituent that comprises an inorganic, non-metal atom selected from the group consisting of sulfur, phosphorus, boron, and chlorine.

19 Claims, 3 Drawing Sheets

(51) Int. Cl.

| | | |
|---|---|---|
| *C09J 5/00* | (2006.01) | |
| *B32B 23/04* | (2006.01) | |
| *B32B 23/20* | (2006.01) | |
| *C09J 101/00* | (2006.01) | |
| *C09J 101/02* | (2006.01) | |
| *C09J 101/08* | (2006.01) | |
| *C08B 7/00* | (2006.01) | |
| *C09J 101/10* | (2006.01) | |
| *C09J 101/12* | (2006.01) | |
| *C09J 101/20* | (2006.01) | |
| *B32B 21/04* | (2006.01) | |
| *B32B 21/13* | (2006.01) | |

(52) U.S. Cl.
CPC . *B32B 23/20* (2013.01); *C08B 7/00* (2013.01); *C08L 97/02* (2013.01); *C09J 5/00* (2013.01); *C09J 101/00* (2013.01); *C09J 101/02* (2013.01); *C09J 101/08* (2013.01); *C09J 101/10* (2013.01); *C09J 101/12* (2013.01); *C09J 101/20* (2013.01); *B32B 2255/08* (2013.01); *B32B 2255/26* (2013.01); *B32B 2307/7145* (2013.01); *C09J 2400/303* (2013.01); *C09J 2401/00* (2013.01); *Y10T 428/24066* (2015.01); *Y10T 428/253* (2015.01); *Y10T 428/31982* (2015.04)

(56) References Cited

U.S. PATENT DOCUMENTS

| | | | |
|---|---|---|---|
| 3,000,876 A | 9/1961 | Touey et al. | |
| 3,075,962 A | 1/1963 | Hiatt et al. | |
| 3,075,963 A | 1/1963 | Hiatt et al. | |
| 3,086,007 A | 4/1963 | Touey et al. | |
| 3,113,674 A | 12/1963 | Kiefer et al. | |
| 3,335,128 A | 8/1967 | Hiatt et al. | |
| 3,624,069 A | 11/1971 | Schweiger | |
| 3,702,845 A | 11/1972 | Steigerwald et al. | |
| 3,759,304 A * | 9/1973 | Lundmark et al. | 144/180 |
| 3,800,797 A | 4/1974 | Tunc | |
| 3,897,782 A | 8/1975 | Tunc | |
| 3,939,836 A | 2/1976 | Tunc | |
| 3,990,833 A | 11/1976 | Holub et al. | |
| 3,991,021 A | 11/1976 | Roth | |
| 4,005,251 A | 1/1977 | Tunc | |
| 4,039,517 A | 8/1977 | Hamamura et al. | |
| 4,147,603 A | 4/1979 | Pacifici et al. | |
| 4,180,536 A | 12/1979 | Howell, Jr. et al. | |
| 4,238,375 A | 12/1980 | Blount | |
| 4,313,857 A | 2/1982 | Blount | |
| 4,336,340 A | 6/1982 | Blount | |
| 4,359,516 A | 11/1982 | Nacci et al. | |
| 4,366,550 A | 12/1982 | Lampe | |
| 4,405,324 A | 9/1983 | Cruz, Jr. | |
| 4,451,638 A | 5/1984 | Blount | |
| 4,590,227 A | 5/1986 | Nakamura et al. | |
| 4,837,271 A | 6/1989 | Brindopke | |
| 4,839,254 A | 6/1989 | Pawlowski et al. | |
| 4,983,730 A | 1/1991 | Domeshek et al. | |
| 5,010,156 A | 4/1991 | Cook et al. | |
| 5,280,097 A * | 1/1994 | Hunter et al. | 527/103 |
| 5,595,700 A | 1/1997 | Kitazawa | |
| 5,609,677 A * | 3/1997 | Itoh et al. | 106/168.01 |
| 5,681,646 A | 10/1997 | Ofosu et al. | |
| 5,711,793 A | 1/1998 | Dannhorn et al. | |
| 5,827,852 A | 10/1998 | Russell et al. | |
| 5,913,311 A | 6/1999 | Ito et al. | |
| 5,973,139 A | 10/1999 | Lee et al. | |
| 6,500,539 B1 | 12/2002 | Chen et al. | |
| 6,599,525 B2 | 7/2003 | Scamilla Aledo et al. | |
| 6,800,754 B1 | 10/2004 | Chauvelon et al. | |
| 6,989,689 B2 | 1/2006 | Ngai et al. | |
| 7,534,379 B2 | 5/2009 | Ellison et al. | |
| 7,671,193 B2 | 3/2010 | Shibata et al. | |
| 7,863,439 B2 | 1/2011 | Ozaki et al. | |
| 2003/0054167 A1 | 3/2003 | Wang | |
| 2003/0143264 A1 | 7/2003 | Margiotta | |
| 2003/0223923 A1 | 12/2003 | Aspinwall et al. | |
| 2004/0077498 A1 | 4/2004 | Lynch | |
| 2007/0167618 A1 | 7/2007 | Wang et al. | |
| 2008/0051502 A1 | 2/2008 | DeRosa et al. | |
| 2008/0156435 A1 | 7/2008 | Kingma et al. | |
| 2008/0213597 A1 | 9/2008 | Li | |
| 2009/0075107 A1 | 3/2009 | Hedrick et al. | |
| 2010/0285295 A1 * | 11/2010 | Wang et al. | 428/292.4 |
| 2010/0291201 A1 | 11/2010 | Shah et al. | |
| 2011/0039694 A1 | 2/2011 | Rosa et al. | |
| 2011/0311833 A1 | 12/2011 | Parker et al. | |

FOREIGN PATENT DOCUMENTS

| | | | |
|---|---|---|---|
| EP | 0940147 | A2 | 9/1999 |
| EP | 1167589 | A1 | 1/2002 |
| EP | 1214922 | A2 | 6/2002 |
| GB | 1177480 | A | 1/1970 |
| JP | 2002003773 | A | 1/2002 |
| JP | 2002115079 | A | 4/2002 |
| JP | 2006079827 | A | 3/2006 |
| JP | 2008258013 | A | 10/2008 |
| KR | 20060098865 | A | 9/2006 |
| KR | 20090084914 | A | 8/2009 |
| WO | 02088288 | A1 | 11/2002 |
| WO | 2009079202 | A1 | 6/2009 |
| WO | 2009086141 | A2 | 7/2009 |

OTHER PUBLICATIONS

International Search Report and Written Opinion for PCT/US2012/056802 dated Apr. 29, 2013.
International Search Report and Written Opinion for PCT/US2012/056810 dated Apr. 8, 2013.
International Search Report and Written Opinion for PCT/US2012/056819 dated Apr. 8, 2013.
International Search Report and Written Opinion for PCT/US2012/056826 dated Apr. 30, 2013.
Baumann et al., "Carbohydrate Polymers as Adhesives," Handbook of Adhesive Technology, 2nd Edition, New York, Marcel Dekker, 2003, pp. 495-510.
Suflet et al., "Phosphorylation of Polysaccharides: New Results on Synthesis and Characterisation of Phosphorylated Cellulose," Reactive & Functional Polymers, 2006, vol. 66, pp. 1240-1249.
Grinshpan et al., "Cellulose Acetate Sulfate as a Lyotropic Liquid Crystalline Polyelectrolyte: Synthesis, Properties, and Application," International Journal of Polymer Science, vol. 2010, Article ID 831658, 2010.

* cited by examiner

ENGINEERED WOOD PRODUCED WITH SUBSTITUTED CELLULOSE ESTER ADHESIVES AND METHODS RELATING THERETO

BACKGROUND

The present invention relates to an engineered wood produced to substituted cellulose ester adhesives, and articles and methods related thereto.

As used herein, the term "engineered wood" refers to derivative wood products manufactured by binding strands, particle, fibers, or veneers of lignin-containing materials together with an adhesive, e.g., composite wood, particle board, plywood, and the like. The most common adhesives used in conjunction with the production of engineered wood are urea-formaldehyde, phenol-formaldehyde, and melamine-formaldehyde resins because they strongly bind to many lignin-containing substrates like wood. However, it is believed that these adhesives may release formaldehyde into the surrounding environment over time, which is undesirable because formaldehyde is a known carcinogen, has a pungent odor, and has been shown to induce asthma attacks in relatively low doses.

Accordingly, formaldehyde-free adhesives are of much interest. However, alternatives, like polyurethane-based adhesives, often have less than satisfactory adhesive properties, which produce, for example, low-quality carpets. Therefore, formaldehyde-free adhesives that exhibit adhesive properties comparable to or better than urea and melamine formaldehyde resins would be of value.

SUMMARY OF THE INVENTION

The present invention relates to an engineered wood produced to substituted cellulose ester adhesives, and articles and methods related thereto.

In one embodiment of the present invention, an engineered wood may comprise a plurality of wood substrates that independently comprise a lignin-containing material, the plurality of wood substrates being adhered together with an adhesive that comprises a substituted cellulose ester that comprises a cellulose polymer backbone having an organic ester substituent and an inorganic ester substituent that comprises an inorganic, nonmetal atom selected from the group consisting of sulfur, phosphorus, boron, and chlorine.

In another embodiment of the present invention, a particle board may comprise a plurality of wood substrates that independently comprise a lignin-containing material and independently have a form selected from the group consisting of a particulate, a chip, a dust, and a shaving, the plurality of wood substrates being adhered together with an adhesive that comprises a substituted cellulose ester that comprises a cellulose polymer backbone having an organic ester substituent and an inorganic ester substituent that comprises an inorganic, nonmetal atom selected from the group consisting of sulfur, phosphorus, boron, and chlorine.

In another embodiment of the present invention, a fiberboard may comprise a plurality of wood substrates that independently comprise a lignin-containing material and independently have a form selected from the group consisting of strand, fiber, and particulate, the plurality of wood substrates being adhered together with an adhesive that comprises a substituted cellulose ester that comprises a cellulose polymer backbone having an organic ester substituent and an inorganic ester substituent that comprises an inorganic, nonmetal atom selected from the group consisting of sulfur, phosphorus, boron, and chlorine.

In yet another embodiment of the present invention, an oriented strand board having a length and a thickness may comprise in order across the thickness of the oriented strand board: a first layer comprising a plurality of first wood substrates that independently comprise a lignin-containing material and independently have a form selected from the group consisting of strand and flake, the plurality of first wood substrates being adhered together in a first orientation substantially parallel to the length of the oriented strand board with an adhesive that comprises a substituted cellulose ester that comprises a cellulose polymer backbone having an organic ester substituent and an inorganic ester substituent that comprises an inorganic, nonmetal atom selected from the group consisting of sulfur, phosphorus, boron, and chlorine; a second layer comprising a plurality of second wood substrates that independently comprise the lignin-containing material and independently have the form selected from the group consisting of strand and flake, the plurality of second wood substrates being adhered together in a second orientation substantially perpendicular to the length of the oriented strand board with the adhesive; and a third layer comprising a plurality of third wood substrates that independently comprise the lignin-containing material and independently have the form selected from the group consisting of strand and flake, the plurality of third wood substrates being adhered together in the first orientation with the adhesive.

In one embodiment of the present invention, a method may comprise providing an adhesive comprising: a substituted cellulose ester that comprises a cellulose polymer backbone having an organic ester substituent and an inorganic ester substituent that comprises an inorganic, nonmetal atom selected from the group consisting of sulfur, phosphorus, boron, and chlorine; and a solvent; and applying the adhesive to a plurality of wood substrates that independently comprise a lignin-containing material; forming at least some of the plurality of wood substrates into a desired shape; and drying the adhesive.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present invention relates to an engineered wood produced to substituted cellulose ester adhesives, and articles and methods related thereto.

The present invention provides for, in some embodiments, an engineered wood that comprise substituted cellulose ester adhesives that may, in some embodiments, advantageously be at least substantially formaldehyde-free. As used herein, the term "substantially formaldehyde-free" refers to the adhesive comprising less than 0.01% formaldehyde by weight of the adhesive.

In addition to not having the disadvantages associated with formaldehyde-based adhesives such as those discussed above, the adhesives described herein are advantageously derived from renewable cellulosic sources. Consequently, the adhesive compositions are, to some degree, degradable in addition to being less noxious. That is, over the long-term the adhesive compositions described herein, under the proper conditions (e.g., in a landfill), may enable and/or enhance the degradation of engineered woods produced therewith. Accordingly, the adhesive compositions described herein provide for an engineered wood that are thought to be both more health-friendly and environmentally-friendly.

It should be noted that when "about" is used in reference to a number in a numerical list, the term "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, the engineered woods of the present invention may comprise a plurality of wood substrates adhered together with a substituted cellulose ester adhesive ("SCE-adhesive"). As used herein, the term "wood substrate" encompasses to particles, fibers, strands, shavings, flakes, chips, or veneers of lignin-containing materials. As used herein, the term "wood veneer" refers to a thin slice of wood, typically thinner than about 4 mm.

In some embodiments, the wood substrates suitable for use in conjunction with the engineered woods of the present invention may include, but are not limited to, sawdust, wood fibers, grass fibers, stalk fibers, sawmill shavings, wood flakes, wood chips, wood dust, and the like, and any combination thereof.

In some embodiments, the lignin-containing materials suitable for use in conjunction with the engineered woods of the present invention may include, but are not limited to, hardwoods (e.g., balsa wood, beech, ash, birch, Brazil wood, cherry, chestnut, elm, hickory, mahogany, maple, oak, rosewood, teak, walnut, locust, mango, alder, and the like), softwoods (e.g., pine, fir, spruce, cedar, hemlock, and the like), cotton, jute, flax, ramie, hemp, sisal, bind, rattan, agave, coir, grass, wheat stalk, rice stalk, barley stalk, tree wood, rye straw, wheat straw, rice straw, hemp stalks, kenaf stalks, sugar cane residue, bamboo, cork, and the like, and any combination thereof.

As used herein, the terms "substituted cellulose ester adhesive" and "SCE-adhesive" refer to an adhesive composition that comprises a substituted cellulose ester. As used herein, the term "substituted cellulose ester" refers to a polymeric compound having a cellulose polymer backbone having an organic ester substituent and an inorganic ester substituent. As used herein, the term "inorganic ester substituent" refers to an ester that comprises an oxygen bound to an R group and an inorganic, nonmetal atom (e.g., sulfur, phosphorus, boron, and chlorine). It should be noted that inorganic esters encompass esters derived from oxoacids that comprise both inorganic, nonmetal atoms and carbon atoms, e.g., alkyl sulfonic acids like methane sulfonic acid. Details of SCE-adhesives suitable for use in conjunction with engineered woods and methods described herein are described further herein.

Exemplary examples of engineered woods of the present invention comprising a plurality of wood substrates adhered together with SCE-adhesives described herein may, in some embodiments, include, but are not limited to, particle board, fiberboard, medium-density fiberboard, high-density fiberboard, oriented strand board, plywood, wood composites, and the like.

By way of nonlimiting example, an engineered wood of the present invention (e.g., a particle board) may comprise a plurality of wood substrates (e.g., lignin-containing particles, lignin-containing chips, lignin-containing shavings, sawdust, wood dust, and the like, and any combination thereof) adhered together with SCE-adhesives described herein.

By way of another nonlimiting example, an engineered wood of the present invention (e.g., a medium density fiberboard or a high density fiberboard) may comprise a plurality of wood substrates (e.g., lignin-containing strands, lignin-containing fibers, lignin-containing particles, wood fibers, sawdust, and the like, and any combination thereof) adhered together with SCE-adhesives described herein.

By way of yet another nonlimiting example, an engineered wood of the present invention (e.g., an oriented strand board) may comprise a plurality of wood substrates (e.g., lignin-containing strands, lignin-containing flakes, wood flake, and the like, and any combination thereof) adhered together in a desired orientation with SCE-adhesives described herein. Desired orientations may include, but are not limited to, substantially parallel with the engineered wood length, substantially perpendicular with the engineered wood length, and any combination thereof. In some embodiments, an engineered wood of the present invention (e.g., an oriented strand board) may comprise a plurality of layers independently comprising a plurality of wood substrates (e.g., lignin-containing strands, lignin-containing flakes, wood flake, and the like, and any combination thereof) adhered together in a desired orientation with SCE-adhesives described herein, e.g., in order, a first layer with a desired orientation of substantially parallel with the engineered wood length, a second layer with a desired orientation of substantially perpendicular with the engineered wood length, and a third layer with a desired orientation of substantially parallel with the engineered wood length.

By way of another nonlimiting example, an engineered wood of the present invention (e.g., plywood) may comprise a plurality of wood substrates (e.g., veneers and the like) adhered together in a layered configuration with SCE-adhesives described herein. In some embodiments, alternating layers may have substantially perpendicular orientations of the grain of the wood substrate.

In some embodiments, the engineered woods of the present invention may be utilized in products, which may include, but are not limited to, furniture or components thereof (e.g., desks, bed rails, headboards, shelving, drawers, cabinets, chests, chairs, ladders, or stools), doors, flooring, moldings, wood trim (e.g., decorative household trim or automotive wood trim), wood paneling, picture frames, window frames, I-beams, and the like. In some embodiments, products may include a first surface at least one engineered wood of the present invention adhered to a second surface of a substrate with an SCE-adhesive described herein (which may be the same or a different SCE-adhesive of the at least one engineered wood). Examples of such a substrate may include, but are not limited to, engineered woods of the present invention, fibrous substrates that comprise natural and/or synthetic fibers, other lignin-containing materials, foams, and the like, and any combination thereof.

Substituted Cellulose Ester Adhesive Compositions

As described above, the terms "substituted cellulose ester adhesive" and "SCE-adhesive" refer to an adhesive composition that comprises a substituted cellulose ester, where the term "substituted cellulose ester" refers to a polymeric compound having a cellulose polymer backbone having an organic ester substituent and an inorganic ester substituent. Further, the term "inorganic ester substituent" refers to an ester wherein the ether linkage of the ester comprises an oxygen bound to an R group and an inorganic, nonmetal atom (e.g., sulfur, phosphorus, boron, and chlorine). It should be noted that inorganic esters encompass esters derived from oxoacids that comprise both inorganic, nonmetal atoms and carbon atoms, e.g., alkyl sulfonic acids like methane sulfonic acid.

Organic ester substituents of a substituted cellulose ester described herein may include, but are not limited to, $C_1$-$C_{20}$ aliphatic esters (e.g., acetate, propionate, or butyrate), aromatic esters (e.g., benzoate or phthalate), substituted aromatic esters, and the like, any derivative thereof, and any combination thereof.

In some embodiments, the degree of substitution of the organic ester substituents of a substituted cellulose ester described herein may range from a lower limit of about 0.2, 0.5, or 1 to an upper limit of less than about 3, about 2.9, 2.5, 2, or 1.5, and wherein the degree of substitution may range from any lower limit to any upper limit and encompass any subset therebetween.

Inorganic ester substituents of a substituted cellulose ester described herein may include, but are not limited to, hypochlorite, chlorite, chlorate, perchlorate, sulfite, sulfate, sulfonates (e.g., taurine, toluenesulfonate, $C_1$-$C_{10}$ alkyl sulfonate, and aryl sulfonate), fluorosulfate, nitrite, nitrate, phosphite, phosphate, phosphonates, borate, and the like, any derivative thereof, and any combination thereof.

In some embodiments, the weight percent of the inorganic, nonmetal atom of the inorganic ester substituent of a substituted cellulose ester described herein may range from a lower limit of about 0.01%, 0.05%, or 0.1% to an upper limit of about 8%, 5%, 3%, 1%, 0.5%, 0.25%, 0.2%, or 0.15%, and wherein the weight percent may range from any lower limit to any upper limit and encompass any subset therebetween.

Substituted cellulose esters for use in conjunction with an SCE-adhesive described herein may be derived from any suitable cellulosic source. Suitable cellulosic sources may include, but are not limited to, softwoods, hardwoods, cotton linters, switchgrass, bamboo, bagasse, industrial hemp, willow, poplar, perennial grasses (e.g., grasses of the Miscanthus family), bacterial cellulose, seed hulls (e.g., soy beans), recycled cellulose, and the like, and any combination thereof. Unexpectedly, it has been discovered, and is described further herein, that the adhesive properties of SCE-adhesives may have a relationship to, inter alia, the cellulosic source from which the substituted cellulose esters are derived. Without being limited by theory, it is believed that other components, e.g., lignin and hemicelluloses, and concentrations thereof in the various cellulosic sources contribute to the differences in adhesive properties of the substituted cellulose esters derived therefrom. By way of nonlimiting example, a softwood may yield an SCE-adhesive with higher binding strength as compared to an SCE-adhesive derived from a hardwood.

In some embodiments, substituted cellulose esters described herein, and consequently SCE-adhesives and engineered woods produced therewith, may be degradable, including biodegradable and/or chemically degradable. Without being limited by theory, it is believed that at least some inorganic ester substituents may be more susceptible to hydrolysis than a corresponding cellulose ester that does not comprise (or minimally comprises) inorganic ester substituents. Further, after some inorganic ester substituents undergo hydrolysis, a strong acid may be produced, which may further speed degradation.

In some embodiments, an SCE-adhesive suitable for use in conjunction with engineered woods of the present invention may comprise at least one substituted cellulose ester and a solvent. Suitable solvents for use in conjunction with an SCE-adhesive described herein may include, but are not limited to, water, acetone, methanol, ethanol, methylethyl ketone, methylene chloride, dioxane, dimethyl formamide, tetrahydrofuran, acetic acid, dimethyl sulfoxide, N-methylpyrrolidinone, dimethyl carbonate, diethyl carbonate, ethylene carbonate, propylene carbonate, and the like, any derivative thereof, and any combination thereof. By way of nonlimiting example, an SCE-adhesive described herein may comprise at least one substituted cellulose ester having an organic ester substituent degree of substitution of greater than about 0 to about 1, an aqueous solvent, and optionally an organic solvent. By way of another nonlimiting example, an SCE-adhesive described herein may comprise at least one substituted cellulose ester having an organic ester substituent degree of substitution of about 0.7 to about 2.7 and a mixed solvent that comprises an aqueous solvent and an organic solvent (e.g., acetone). By way of yet another nonlimiting example SCE-adhesives of the present invention may, in some embodiments, comprise at least one substituted cellulose ester having an organic ester substituent degree of substitution of about 2.4 to less than about 3, an organic solvent (e.g., acetone), and optionally an aqueous solvent at about 15% or less by weight of the organic solvent.

In some embodiments, an SCE-adhesive suitable for use in conjunction with engineered woods of the present invention may be formaldehyde-free, which may also be described as "an adhesive with no added formaldehyde." In some embodiments, an SCE-adhesive for use in conjunction with engineered woods of the present invention may be substantially formaldehyde-free, i.e., comprise less than 0.01% formaldehyde by weight of the substituted cellulose acetate of the SCE-adhesive composition.

In some embodiments, SCE-adhesives suitable for use in conjunction with engineered woods of the present invention may further comprise an additive. Additives suitable for use in conjunction with SCE-adhesives described herein may include, but are not limited to, plasticizers, crosslinkers, insolubilizers, starches, fillers, thickeners, rigid compounds, water resistance additives, flame retardants, lubricants, softening agents, antibacterial agents, antifungal agents, pigments, dyes, and any combination thereof.

Plasticizers may, in some embodiments, allow for tailoring the viscosity and/or affecting adhesive properties of SCE-adhesives described herein. Examples of plasticizers suitable for use in conjunction with SCE-adhesives described herein may include, but are not limited to, glycerin, glycerin esters, polyethylene glycol, diethylene glycol, polypropylene glycol, polyglycoldiglycidyl ethers, dimethyl sulfoxide, alkylphosphate esters, polycaprolactone, triethyl citrate, acetyl trimethyl citrate, dibutyl phthalate, diaryl phthalate, diethyl phthalate, dimethyl phthalate, di-2-methoxyethyl phthalate, dibutyl tartrate, ethyl o-benzoylbenzoate, ethyl phthalyl ethyl glycolate, methyl phthalyl ethyl glycolate, n-ethyltoluenesulfonamide, triacetin, triacetin, o-cresyl p-toluenesulfonate, trimethyl phosphate, triethyl phosphate, tributyl phosphate, triphenyl phosphate, tripropionin, polycaprolactone, and the like, any derivative thereof, and any combination thereof.

Crosslinkers may, in some embodiments, increase the adhesive properties and/or increase water resistance of SCE-adhesives described herein. Examples of crosslinkers suitable for use in conjunction with an SCE-adhesive described herein may, in some embodiments, include, but are not limited to, Lewis-acidic salts (e.g., magnesium salts, aluminum salts, and zirconium salts, and in particular chloride and nitrate salts thereof), boric acid, borate salts, phosphate salts, ammonium zirconium carbonate, potassium zirconium carbonate, metal chelates (e.g., zirconium chelates, titanium chelates, and aluminum chelates), formaldehyde crosslinkers, polyamide epichlorohydrin resin, crosslinkers like urea glyoxal adducts and alkylates thereof (e.g., methylated glyoxal adducts and N-methylolated glyoxal adduct derivatives), crosslinkers containing N-methylol groups, crosslinkers containing etherified N-methylol groups, and the like, any derivative thereof, and any combination thereof. Additional crosslinker examples may include N-hydroxymethyl-reactive resins like 1,3-dimethylol-4,5-dihydroxyimidazolidinone (4,5-dihydroxy-N,N'-dimethylolethyleneurea) or their at least partly etherified derivatives (e.g., derivatives with hydroxymethylated cyclic ethyleneureas, hydroxymethylated cyclic propyleneureas, hydroxymethylated bicyclic glyoxal diureas, and hydroxymethylated bicyclic malonaldehyde diureas). Examples of at least partly etherified derivatives of hydroxymethylated cyclic ethyleneureas may include, but are not limited to, ARKOFIX® products (e.g., for example ARKOFIX® NEC plus or ARKOFIX® NES (ultra-low formaldehyde crosslinking agents, available from Clariant SE Switzerland), glyoxal, urea formaldehyde adducts, melamine formaldehyde adducts, phenol formaldehyde adducts, hydroxymethylated cyclic ethyleneureas, hydroxymethylated cyclic thioethyleneureas, hydroxymethylated cyclic propyleneureas, hydroxymethylated bicyclic glyoxal diurea, hydroxymethylated bicyclic malonaldehyde diureas, polyaldehydes (e.g., dialdehydes), protected polyaldehydes (e.g., protected dialdehydes), bisulfite protected polyaldehydes (e.g., bisulfite protected dialdehydes), isocyanates, blocked isocyanates, dimethoxytetrahydrafuran, dicarboxylic acids, epoxides, diglycidyl ether, hydroxymethyl-substituted imidazolidinone, hydroxymethyl-substituted pyrimidinones, hydroxymethyl-substituted triazinones, oxidized starch, oxidized polysaccharides, oxidized hemicellulose, and the like, any derivative thereof, and any combination thereof. Combinations of any of the foregoing examples may also be suitable. For example, hydroxymethylated compounds, at least partly etherified derivatives of hydroxymethylated compounds, dialdehyde-based compounds, and/or capped dialdehyde compounds may be useful in combination with Lewis-acidic salts. One skilled in the art with the benefit of this disclosure should understand that formaldehyde crosslinkers should be excluded from use in conjunction with formaldehyde-free SCE-adhesives, and limited in substantially formaldehyde-free SCE-adhesives.

Insolubilizer additives may, in some embodiments, increase the hydrophobic nature of the adhesive. Examples of insolubilizer additives for use in conjunction with SCE-adhesives described herein may, in some embodiments, include, but are not limited to, copolymers of polyvinyl alcohol and polyvinyl acetate, glyoxal, glycerin, sorbitol, dextrine, alpha-methylglucoside, and the like, and any combination thereof.

Water resistance additives may, in some embodiments, increase the water resistance properties of SCE-adhesives described herein, which may consequently yield engineered woods capable of maintaining their mechanical properties in environments with higher water concentrations, e.g., humid environments. Examples of water resistance additives for use in conjunction with SCE-adhesives described herein may include, but are not limited to, waxes, polyolefins, insolubilizers, or combinations thereof.

Fillers may, in some embodiments, increase the rigidity of SCE-adhesives described herein, which may consequently increase the mechanical rigidity of an engineered wood produced therewith. Fillers suitable for use in conjunction with SCE-additives described herein may include, but are not limited to, coconut shell flour, walnut shell flour, wood flour, wheat flour, soybean flour, gums, starches, protein materials, calcium carbonate, zeolite, clay, rigid compounds (e.g. lignin), thickeners, and the like, and any combination thereof.

Flame retardants suitable for use in conjunction with SCE-additives described herein may include, but are not limited to, silica, organophosphates, polyhalides, and the like, and any combination thereof.

In some embodiments, SCE-adhesives described herein may be characterized as having a solids content (contributed to, at least in part, by some additives) ranging from a lower limit of about 4%, 8%, 10%, 12%, or 15%, to an upper limit of about 75%, 50%, 45%, 35%, or 25%, and wherein the solids content may range from any lower limit to any upper limit and encompass any subset therebetween.

In some embodiments, an engineered wood of the present invention may comprise a plurality of wood substrates (e.g., any wood substrate disclosed herein including combinations thereof) and SCE-adhesives, according to any embodiments disclosed herein, disposed between at least a portion of at least two of the wood substrates. SCE-adhesives may, in some embodiments, comprise substituted cellulose esters according to any embodiment disclosed herein, optionally solvent, and optionally any additives. Substituted cellulose esters may, in some embodiments, comprise a polymeric compound having a cellulose polymer backbone having an organic ester substituent and an inorganic ester substituent and have at least one characteristic selected from the group consisting of at least one organic ester substituent according to those described herein, an organic ester substituent degree of substitution from about 0.2 to less than about 3, at least one inorganic ester substituent according to those described herein, a weight percent of the inorganic, nonmetal atom of the inorganic ester substituent between about 0.01% and about 1%, being derived from a cellulose material described herein, and any combination thereof.

Substituted cellulose esters described herein may be produced utilizing one of several synthesis routes that, in some embodiments, comprise a hydrolysis reaction where water and inorganic ester oxoacid catalysts are added to a cellulose ester mixture so as to yield the substituted cellulose esters. The synthesis of substituted cellulose esters described herein is described in further detail in copending International Patent Application No. PCT/US12/56802 entitled "Substituted Cellulose Ester Adhesives and Methods and Articles Relating Thereto" filed on the same day as the present application, the entire disclosure of which is incorporated herein by reference. Three nonlimiting examples of synthesis routes are illustrated in FIGS. 1-3.

Figure 1:
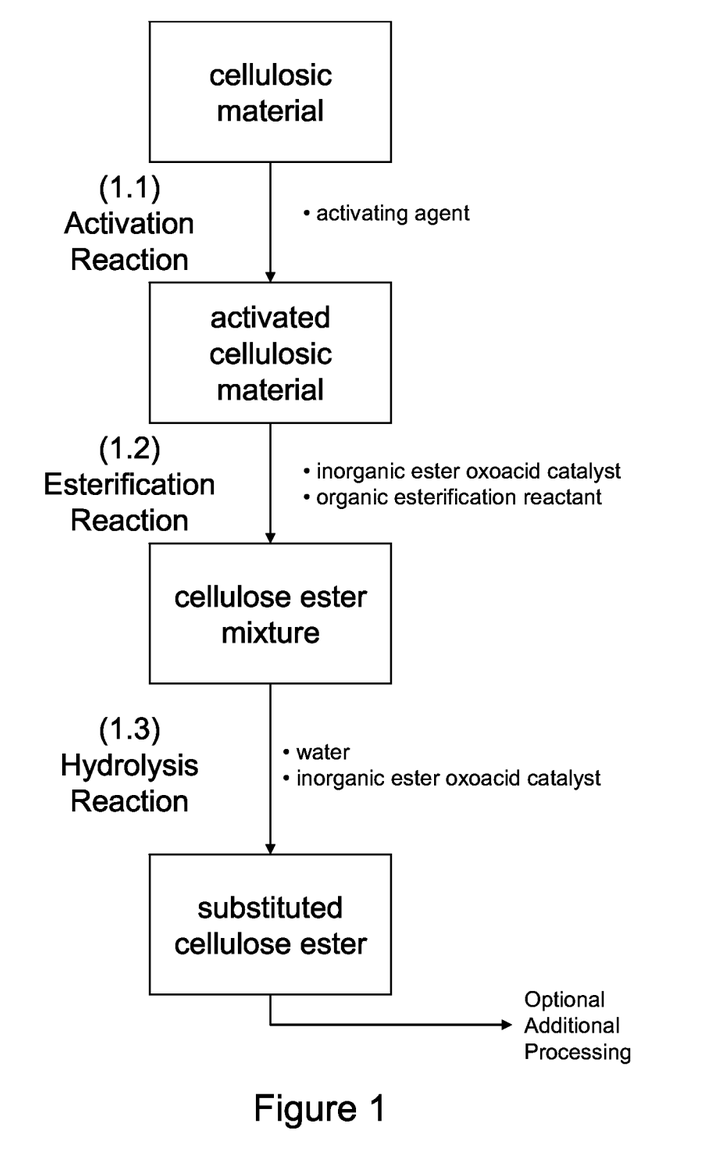
FIG. 1 provides a nonlimiting example of a substituted cellulose ester synthesis route according to at least some embodiments of the present invention.

Referring now to FIG. 1, in some embodiments, a cellulosic material may undergo (1.1) an activation reaction that swells the cellulosic material in the presence of an activating agent so as to make internal surfaces accessible for subsequent reactions, (1.2) an esterification reaction in the presence of an inorganic ester oxoacid catalyst and an organic esterification reactant so as to yield a cellulose ester mixture, and (1.3) a hydrolysis reaction in the presence of water and additional inorganic ester oxoacid catalyst so as to yield substituted cellulose esters. In some embodiments, the substituted cellulose esters may then optionally be further processed, e.g., to yield purified substituted cellulose esters. In some embodiments, the inorganic ester oxoacid catalyst of the (1.2) esterification reaction and the (1.3) hydrolysis reaction may be the same or different inorganic ester oxoacid catalysts.

Figure 2:
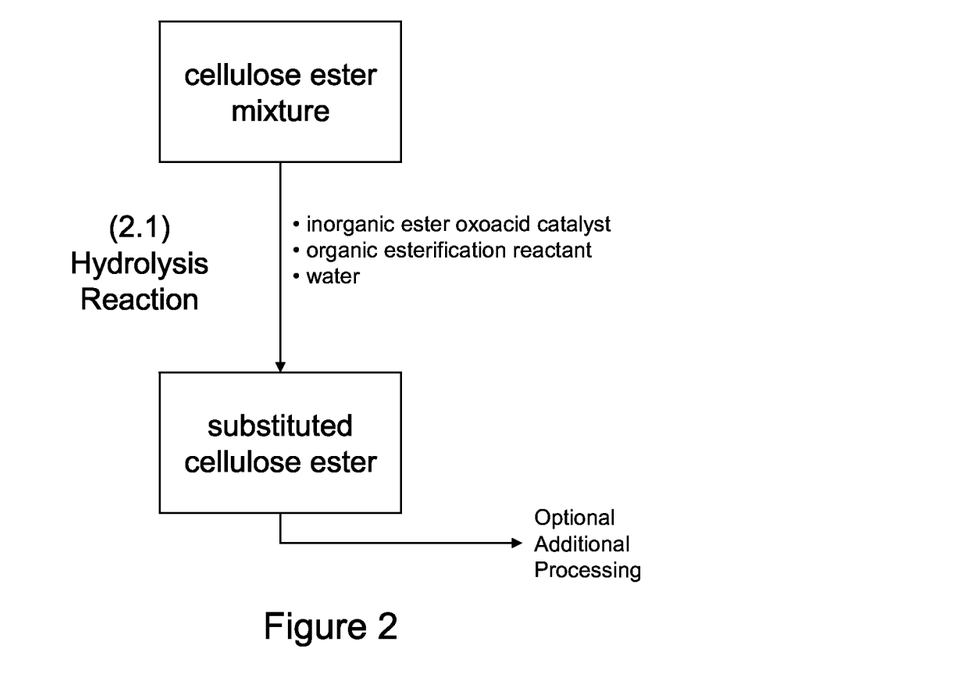
FIG. 2 provides a nonlimiting example of a substituted cellulose ester synthesis route according to at least some embodiments of the present invention.

Referring now to FIG. 2, in some embodiments, synthesis of substituted cellulose esters may begin with the cellulose ester starting material, e.g., cellulose acetate. As shown in FIG. 2, a cellulose ester mixture (e.g., a swollen cellulose acetate in acetic acid) may undergo (2.1) a hydrolysis reaction in the presence of water, an inorganic ester oxoacid catalyst, and an organic esterification reactant, so as to yield substituted cellulose esters that may optionally be further processed.

Figure 3:
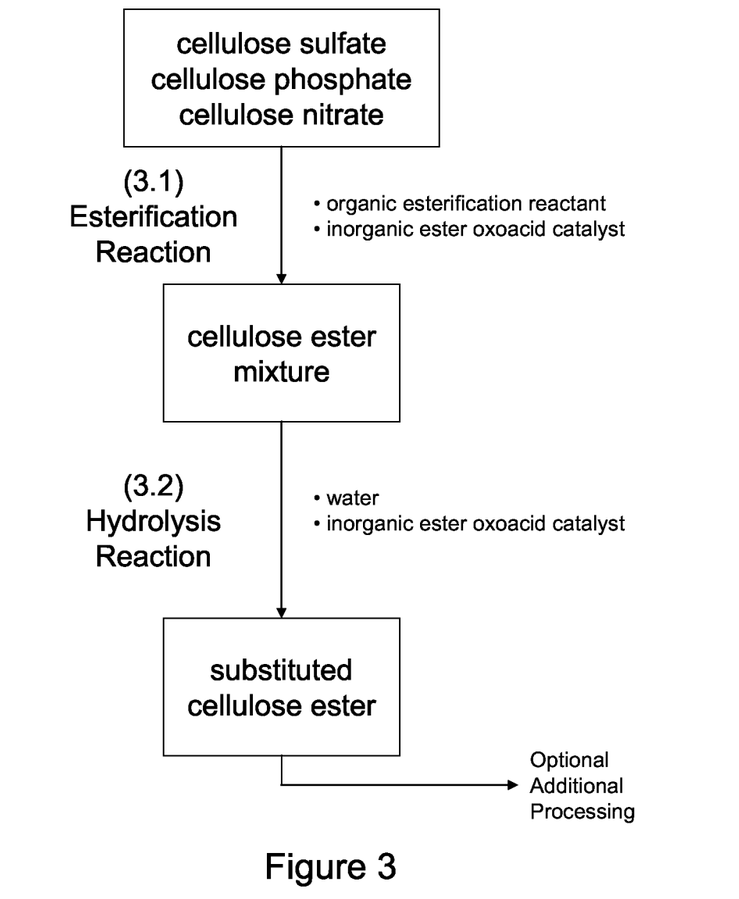
FIG. 3 provides a nonlimiting example of a substituted cellulose ester synthesis route according to at least some embodiments of the present invention.

Referring now to FIG. 3, in some embodiments, synthesis of substituted cellulose esters may begin with a cellulose sulfate, cellulose phosphate, and/or cellulose nitrate starting material. As shown in FIG. 3, the cellulose sulfate, cellulose phosphate, and/or cellulose nitrate starting material may undergo (3.1) an esterification reaction in the presence of an inorganic ester oxoacid catalyst and an organic esterification reactant so as to yield a cellulose ester mixture, and optionally (3.2) a hydrolysis reaction in the presence of additional inorganic ester oxoacid catalyst so as to yield substituted cellulose esters that may optionally be further processed. In some embodiments, the (3.2) hydrolysis reaction may optionally further utilize water, as illustrated in FIG. 3. In some embodiments, the inorganic ester oxoacid catalyst of (3.1) an esterification reaction and optionally (3.2) a hydrolysis reaction may be the same or different inorganic ester oxoacid catalysts. One skilled in the art, with the benefit of this disclosure, should recognized that (3.2) the hydrolysis reaction is optional in this synthesis scheme as the starting material has inorganic ester substituents, some of which may be converted to organic ester substituents in (3.1) the esterification reaction, thereby yielding a substituted cellulose ester described herein.

As illustrated in the nonlimiting examples above, in some embodiments, the synthesis of substituted cellulose esters described herein may involve, inter alia, a hydrolysis reaction where inorganic ester oxoacid catalysts, water, and optionally other reactants are added to a cellulose ester mixture so as to yield the substituted cellulose esters. Further, it should be noted that in the nonlimiting examples above, the various chemical components may be mixed and/or added to the corresponding material and/or mixture in a plurality of sequences that may including multiple additions of any chemical component. In some preferred embodiments, hydrolysis reactions that include organic esterification reactants may be carried with adding the water after the inorganic ester oxoacid catalyst and the organic esterification reactant, so as to minimize potentially deactivating reactions between the water and the other reactants or intermediates thereof. In some preferred embodiments, hydrolysis reactions that do not include organic esterification reactants may be carried with concurrent addition of the water and the inorganic ester oxoacid catalyst, so as to minimize any potential degradation of the cellulose ester mixture by the inorganic ester oxoacid catalyst.

Methods of Making Engineered Woods

In some embodiments, producing the engineered woods of the present invention may involve applying an SCE-adhesive described herein to at least a portion of a first surface of a first wood substrate; placing a second surface of a second wood substrate in contact with the portion of the first surface; and drying the SCE-adhesive. In some embodiments, producing the engineered woods may further comprise applying an SCE-adhesive to at least a portion of the second surface that contacts the portion of the first surface.

In some embodiments, producing the engineered woods of the present invention may involve applying an SCE-adhesive described herein to a plurality of wood substrates; forming at least some of the plurality of wood substrates into a desired shape; and drying the SCE-adhesive. Desired shapes may include, but are not limited to, sheets of a desired thickness, billets, spheres, cylinders, rods, elongated forms with a polygonal cross-section (optionally with rounded corners), a formed shape (e.g., a dashboard), and the like, and any hybrid thereof. In some embodiments, forming the plurality of substrates into a desired shape may involve applying heat and/or applying pressure, e.g., cold-compression, hot-compression, or a combination thereof. In some embodiments, applying pressure may be static (e.g., using a c-clamp), moving (e.g., between rollers), any hybrid thereof, and any combination thereof, either continuously or intermittently.

In some embodiments, applying an SCE-adhesive described herein to a wood substrate may involve: painting, rolling, smearing, spreading, squeezing, spraying, atomizing, dotting, any hybrid thereof, and any combination thereof, either continuously or intermittently. In some embodiments, an SCE-adhesive may comprise a solvent system that enables spraying through nozzles so as to adequately disperse and apply the adhesive to the plurality of wood substrates, especially with particulate, fiber, chip, dust, and flake wood substrates.

In some embodiments, drying an SCE-adhesive described herein may involve: allowing time to pass, pulling vacuum, applying an air force, applying heat, applying pressure, and any combination thereof, either continuously or intermittently. In some embodiments, applying pressure may be static (e.g., using a c-clamp), moving (e.g., between rollers), any hybrid thereof, and any combination thereof, either continuously or intermittently.

EXAMPLES

Example 1

Three substituted cellulose esters and two cellulose esters were produced and analyzed. Cellulose was treated with acetic acid and then mixed with a cooled solution of acetic acid, acetic anhydride, and sulfuric acid. The temperature of the resultant mixture was increased and allowed to react for about 20 minutes. At this point, cellulose ester compositions were hydrolyzed. To produce substituted cellulose esters, the mixture was hydrolyzed in the presence of additional sulfuric acid. Table 1 below provides the conditions for the production of the five samples.

TABLE 1

|  | Time | Temp (° C.) | Acetyl Value (% as acetic acid) | Sulfur Content (ppm) | $SO_4$ Content (ppm) |
| --- | --- | --- | --- | --- | --- |
| CA-1 | 6 | 73.0 | 39.03 | 105 | 314 |
| CA-2 | 4.5 | 75.0 | 40.15 | 160 | 481 |
| SCA-1 | 6 | 65.0 | 41.43 | 807 | 2419 |
| SCA-2 | 4.5 | 70.0 | 38.02 | 268 | 805 |
| SCA-3 | 4.5 | 68.5 | 39.08 | 429 | 1286 |

This example is thought to demonstrate that substituted cellulose esters (specifically, substituted cellulose acetates) can be produced with high sulfur contents at relatively low temperatures and short hydrolysis times that are comparable to standard cellulose acetate hydrolysis times, which is advantageous in the commercial-scale production of substituted cellulose esters.

Example 2

Several adhesive compositions (Adhesives 1-5) having varied solvents and substituted cellulose acetate compositions were tested for their adhesive properties in a variety of wood laminates. Further, two wood laminates were produced and analyzed with commercially available ELMER'S GLUE ALL® (a poly(vinyl acetate)-based adhesive, available from Elmer's Products, Inc.). Table 2 provides the wood laminate compositions, and Table 3 provides the results of Lap Shear tests conducted using INSTRON® (Model 3366) as a measure of the adhesive properties of the various adhesive compositions.

Upon visual inspection, the substituted cellulose acetate adhesives of this example were optically clear and had a high gloss, which may be desirable in some commercial applications.

To form the laminates, two small wooden blocks or two cardboard pieces were glued together using a 10% aqueous solution of the Adhesives 1-5 (Table 2) or ELMER'S GLUE ALL® (as noted) and allowed to dry. The resulting laminates were difficult to separate (i.e., none of the blocks broke in the tensile testing setup used or the cardboard failed before the adhesive bond). When enough force was applied to separate the blocks, the wood fibers broke which suggests that the substituted cellulose acetate adhesive is at least as strong as the wood fibers.

TABLE 2

| Sample | Adhesive | Solvent System | Solids (wt %) | Sulfur (mg/kg) | Substrate | Drying |
|---|---|---|---|---|---|---|
| 1 | ELMER'S GLUE ALL ® | emulsion | 54 | — | cardboard | 1 hr (ambient) |
| 2 | Adhesive 1 | aqueous | 10 | not measured | cardboard | 1 hr (ambient) |
| 3 | Adhesive 2 | aqueous | 20 | 4940 | wood | 2.25 hr (ambient) |
| 4 | Adhesive 3 | aqueous | 15 | 4530 | wood | 2.25 hr (ambient) |
| 5 | Adhesive 4 | mixed organic/aqueous | 10 | 4940 | wood | 2.25 hr (ambient) |
| 6 | Adhesive 2 | aqueous | 15 | 4940 | wood | 2.25 hr (ambient) |
| 7 | ELMER'S GLUE ALL ® | emulsion | 27 | — | wood | overnight (ambient) |
| 8 | Adhesive 5 | aqueous | 10 | 5570 | wood | 1 hr (120° C.) |
| 9 | Adhesive 5 | aqueous | 10 | 5570 | wood | 1 hr (120° C.) |
| 10 | Adhesive 5 | aqueous | 10 | 5570 | wood | 1 hr (120° C.) |

TABLE 3

| Sample | Adhesive | Substrate | Additional Treatment | Break Point (kgf) | Comments |
|---|---|---|---|---|---|
| 1 | ELMER'S GLUE ALL ® | cardboard | | 58.94 | paper failure |
| 2 | Adhesive 1 | cardboard | | 43.86 | paper failure |
| 3 | Adhesive 2 | wood | | >107 | exceeded load cell capacity |
| 4 | Adhesive 3 | wood | | >107 | exceeded load cell capacity |
| 5 | Adhesive 4 | wood | | >107 | exceeded load cell capacity |
| 6 | Adhesive 2 | wood | | >107 | exceeded load cell capacity |
| 7 | ELMER'S GLUE ALL ® | wood | | >107 | exceeded load cell capacity |
| 8 | Adhesive 5 | wood | | >107 | exceeded load cell capacity |
| 9 | Adhesive 5 | wood | 1 hr (4° C.) | >107 | exceeded load cell capacity |
| 10 | Adhesive 5 | wood | 1 hr (4° C.) | >107 | exceeded load cell capacity |

It is believed that this example demonstrates, among many things, that substituted cellulose acetates with high sulfur content are effective as an adhesive on a variety of substrates.

Example 3

Various additives were added to three adhesive compositions that comprise substituted cellulose acetate according to at least some embodiments described herein. The resulting compositions were tested for their adhesive properties on wood substrates (¼" pine strips 1.5" in width) using INSTRON® (Model 3366) Lap Shear test. Summaries of the results are shown below in Tables 4 and Table 5.

Adhesive 6 comprises substituted cellulose acetate having about 620 mg/kg of sulfur. To the Adhesive 6, varying amounts of ammonium zirconium carbonate were added. Table 4 provides the results of the Lap Shear test for the various compositions.

TABLE 4

| % Zr by wt of total solution (% Zr by wt of solids) | Average Break (kgf)* | Average Break (psi)** | Stnd. Dev. |
|---|---|---|---|
| 0 (0) | 179 | 263 | 32 |
| 0.04% (0.2%) | 271 | 398 | 110 |
| 0.08% (0.4%) | 280 | 411 | 35 |

TABLE 4-continued

| % Zr by wt of total solution (% Zr by wt of solids) | Average Break (kgf)* | Average Break (psi)** | Stnd. Dev. |
|---|---|---|---|
| 0.16% (0.9%) | 300 | 441 | 71 |
| 0.32% (1.8%) | 362 | 532 | 45 |

*average of 6 replicates
**lap shear of 1.5" × 1" adhered area

Adhesives 7 and 8 comprise substituted cellulose acetates having about 520 mg/kg of sulfur and about 557 mg/kg of sulfur, respectively. To the Adhesives 7 and 8, varying amounts of additives were added. Table 5 provides the results of the Lap Shear test for the various compositions.

TABLE 5

| Additive | Adhesive 7 Break Point (kgf) | Adhesive 8 Break Point (kgf) |
|---|---|---|
| no additive | 225 | 349 |
| ammonium zirconium carbonate (14% by wt of solids) | 348 | 245 |
| polyvinyl acetate (MW~140,000) (14% by wt of solids) | 271 | 210 |
| polyvinyl alcohol (MW~150,000) (14% by wt of solids) | not tested | 154 |

As shown in Table 4, the addition of zirconium can increase the strength required to break the bond formed by substituted cellulose ester adhesives. Further, Table 5 demonstrates the use of other polymer as plasticizer in substituted cellulose ester adhesives, which may advantageously allow for tailoring the adhesive strength of such compositions.

Example 4

A plurality of adhesives samples were prepared by adding 8% by weight of a substituted cellulose acetate having about 1286 mg/kg sulfur to the desired solvent system as outlined in Table 6. The adhesive samples were mixed overnight. The crosslinkers (if applicable) were added in amounts outlined in Table 6, and the adhesive samples were mixed for about 2 minutes. The adhesive samples were used to adhere two blocks of pine wood together and allowed to dry for 15 minutes at 120° C. The Lap Shear test for was tested as described in Example 2.

TABLE 6

| Adhesive | Solvent | Crosslinker | Break Point (kgf) |
|---|---|---|---|
| 9 | 6 parts ethanol | none | 182.68 |
| 10 | 4 parts water | NES* (1%**) | 227.88 |
| 11 | | ZA* (0.5%) | 242.38 |
| 12 | 7 parts water | none | 161.45 |
| 13 | 2 parts ethanol | NES (1%) | 310.38 |
| 14 | 1 part acetone | ZA (0.5%) | 145.10 |
| 15 | 4 parts water | none | 109.60 |
| 16 | 1 part ethanol | NES (1%) | 202.96 |
| 17 | 5 parts acetone | ZA (0.5%) | 134.14 |
| 18 | 8 parts water | none | 138.89 |
| 19 | 1.5 parts dimethyl carbonate | NES (1%) | 189.30 |
| 20 | 0.5 parts acetone | NES (4%) | 379.44 |
| 21 | | ZA (0.5%) | 285.12 |
| 22 | | ZA (1%) | 349.53 |
| 23 | 7 parts water | none | 175.99 |

TABLE 6-continued

| Adhesive | Solvent | Crosslinker | Break Point (kgf) |
|---|---|---|---|
| 24 | 2 parts dimethyl carbonate | NES (1%) | 167.71 |
| 25 | 1 part acetone | AZC* (1%) | 294.87 |

*NES is modified dimethylol dihydroxy ethylene urea (available as ARKOFIX ® NES from Clariant), ZA is zirconium acetate, and AZC is ammonium zirconium carbonate.
**Crosslinker concentrations are by weight of the solids content of the sample.

This example demonstrates that both the crosslinker and the solvent system may affect the adhesive properties of substituted cellulose ester adhesives, which may allow for two additional handles that can be utilized in tailoring the adhesive properties for substituted cellulose ester adhesives for the desired application.

Example 5

A plurality of adhesives samples were prepared by adding 12% by weight of a substituted cellulose acetate having about 997 mg/kg sulfur to the desired solvent system as outlined in Table 7. The adhesive samples were mixed overnight. The adhesive samples were used to adhere two blocks of pine wood together and allowed to dry for 15 minutes at 120° C. The Lap Shear test for was tested as described in Example 2.

TABLE 7

| Solvent System | | | | |
|---|---|---|---|---|
| dimethyl carbonate | acetone | water | ethanol | Break Point (kgf) |
| 0 | 80 | 20 | 0 | 284.10 |
| 15 | 15 | 70 | 0 | 293.38 |
| 10 | 10 | 80 | 0 | 302.17 |
| 20 | 5 | 75 | 0 | 302.63 |
| 0 | 0 | 40 | 60 | 318.97 |
| 20 | 10 | 70 | 0 | 334.33 |
| 5 | 15 | 80 | 0 | 358.10 |
| 15 | 5 | 80 | 0 | 359.00 |
| 0 | 10 | 40 | 50 | 360.06 |
| 5 | 15 | 80 | 0 | 366.00 |
| 0 | 20 | 80 | 0 | 382.43 |
| 10 | 0 | 70 | 20 | 404.86 |

This example demonstrates that solvent system may affect the adhesive properties of substituted cellulose ester adhesives, which may allow for an additional handle that can be utilized in tailoring the adhesive properties for substituted cellulose ester adhesives for the desired application.

Example 6

A plurality of adhesives samples were prepared by adding 8% by weight of a substituted cellulose acetate having about 1286 mg/kg sulfur to the desired solvent system as outlined in Table 8. The adhesive samples were mixed overnight. A crosslinker of NES at 1% by weight of the solids content of the sample and a crosslinker catalyst ad outlined in Table 8 (if applicable) at 1.5% by weight of the solids content of the sample were added to the adhesives samples, and the adhesive samples were mixed for about 2 minutes. The adhesive samples were used to adhere two blocks of pine wood together and allowed to dry for 15 minutes at 120° C. The Lap Shear test for was tested as described in Example 2.

TABLE 8

| Adhesive | Solvent | Crosslinker | Break Point (kgf) |
|---|---|---|---|
| 26 | 6 parts ethanol | None | 227.88 |
| 27 | 4 parts water | $MgCl_2$ | 165.69 |
| 28 | | $AlCl_3$ | 174.59 |
| 29 | 7 parts water | None | 310.38 |
| 30 | 2 parts ethanol | $MgCl_2$ | 271.45 |
| 31 | 1 part acetone | $AlCl_3$ | 175.57 |
| 32 | 4 parts water | None | 202.96 |
| 33 | 1 part ethanol | $MgCl_2$ | 144.42 |
| 34 | 5 parts acetone | $AlCl_3$ | 140.17 |

This example demonstrates that a crosslinker catalyst is not required to initiate crosslinking with the NES crosslinker, which typically does require such a crosslinker catalyst. Further, such crosslinker catalysts may reduce the adhesive properties of substituted cellulose ester adhesives.

Example 7

Two samples of substituted cellulose acetates were derived from hardwood or softwood having about 1290 mg/kg sulfur or about 1000 mg/kg sulfur, respectively. Each substituted cellulose ester sample was used in producing an SCE-adhesive having 12% solids and no crosslinkers in a solvent system of 60% ethanol and 40% water. The adhesive samples were used to adhere two blocks of either pine or birch wood together and allowed to dry for 15 minutes at 120° C. The Lap Shear test for was tested as described in Example 2.

As reported in Table 9, the use of the softwood-derived cellulose acetate yielded a stronger adhesive, e.g., about 60% higher lap strength when adhering pine and about 20% higher lap strength when adhering birch, which demonstrates that the cellulosic source from which a substituted cellulose ester is derived may affect the adhesive properties of the resultant SCE-adhesive.

TABLE 9

| Pulp | Substrate | Average Break (kgf)* | Stnd. Dev. |
|---|---|---|---|
| hardwood | pine | 280 | 10 |
| hardwood | birch | 452 | 8 |
| softwood | pine | 445 | 17 |
| softwood | birch | 549 | 9 |

*average of 2 replicates

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. An engineered wood comprising:
a plurality of wood substrates that independently comprise a lignin-containing material, the plurality of wood substrates being adhered together with an adhesive that comprises a substituted cellulose ester that comprises a cellulose polymer backbone having an organic ester substituent and an inorganic ester substituent that comprises an inorganic, nonmetal atom selected from the group consisting of sulfur, phosphorus, boron, and chlorine.

2. The engineered wood of claim 1, wherein at least some of the plurality of wood substrates independently have a form selected from the group consisting of a particle, a fiber, a strand, a shaving, a flake, a chip, a dust, and a veneer.

3. The engineered wood of claim 1, wherein the substituted cellulose ester is derived from at least one selected from the group consisting of a softwood, a hardwood, a cotton linter, switchgrass, bamboo, bagasse, industrial hemp, willow, poplar, a perennial grass, bacterial cellulose, a seed hull, recycled cellulose, and any combination thereof.

4. The engineered wood of claim 1, wherein the organic ester substituent comprises at least one selected from the group consisting of a $C_1$-$C_{20}$ aliphatic ester, an aromatic ester, any derivative thereof, and any combination thereof.

5. The engineered wood of claim 1, wherein the inorganic ester substituent is selected from the group consisting of hypochlorite, chlorite, chlorate, perchlorate, sulfite, sulfate, a sulfonate, fluorosulfate, nitrite, nitrate, phosphite, phosphate, a phosphonate, a phosphinate, an alkyl phosphonate, borate, any derivative thereof, and any combination thereof.

6. The engineered wood of claim 1, wherein the inorganic, nonmetal atom is present in an amount of about 0.01% or greater by weight of the substituted cellulose ester.

7. The engineered wood of claim 1, wherein the substituted cellulose ester has a degree of substitution ranging from about 0.2 to less than about 3.

8. The engineered wood of claim 1, wherein the adhesive further comprises a solvent comprising at least one selected from the group consisting of water, ethanol, acetone, methylethyl ketone, methylene chloride, dioxane, dimethyl formamide, methanol, tetrahydrofuran, acetic acid, dimethyl sulfoxide, N-methyl pyrrolidinone, dimethyl carbonate, diethyl carbonate, ethylene carbonate, propylene carbonate, and any combination thereof.

9. The engineered wood of claim 1, wherein the adhesive further comprises an additive comprising at least one selected from the group consisting of a plasticizer, a crosslinker, an insolubilizer, a starch, a filler, a thickener, a rigid compound, a water resistance additive, a flame retardant, a lubricant, a softening agent, an antibacterial agent, an antifungal agent, a pigment, a dye, and any combination thereof.

10. The engineered wood of claim 1, wherein the engineered wood is at least one selected from the group consisting of a particle board, a fiberboard, a medium-density fiberboard, a high-density fiberboard, an oriented strand board, a plywood, and a wood composite.

11. A product comprising the engineered wood of claim 1, wherein the product is at least one selected from the group consisting of plywood, furniture or a component thereof, a door, flooring, a molding, wood trim, wood paneling, a picture frame, a window frame, and an I-beam.

12. The engineered wood of claim 1, wherein the adhesive consists essentially of the substituted cellulose ester.

13. The engineered wood of claim 1, wherein the adhesive consists essentially of the substituted cellulose ester and a solvent.

14. The engineered wood of claim 1, wherein the adhesive consists essentially of the substituted cellulose ester and an additive comprising at least one selected from the group consisting of a plasticizer, a crosslinker, an insolubilizer, a starch, a filler, a thickener, a rigid compound, a water resistance additive, a flame retardant, a lubricant, a softening agent, an antibacterial agent, an antifungal agent, a pigment, a dye, and any combination thereof.

15. The engineered wood of claim 1, wherein the adhesive consists essentially of the substituted cellulose ester, a solvent, and an additive that comprises at least one selected from the group consisting of a plasticizer, a crosslinker, an insolubilizer, a starch, a filler, a thickener, a rigid compound, a water resistance additive, a flame retardant, a lubricant, a softening agent, an antibacterial agent, an antifungal agent, a pigment, a dye, and any combination thereof.

16. A particle board comprising:
a plurality of wood substrates that independently comprise a lignin-containing material and independently have a form selected from the group consisting of a particulate, a chip, a dust, and a shaving, the plurality of wood substrates being adhered together with an adhesive that comprises a substituted cellulose ester that comprises a cellulose polymer backbone having an organic ester substituent and an inorganic ester substituent that comprises an inorganic, nonmetal atom selected from the group consisting of sulfur, phosphorus, boron, and chlorine.

17. A fiberboard comprising:
a plurality of wood substrates that independently comprise a lignin-containing material and independently have a form selected from the group consisting of strand, fiber, and particulate, the plurality of wood substrates being adhered together with an adhesive that comprises a substituted cellulose ester that comprises a cellulose polymer backbone having an organic ester substituent and an inorganic ester substituent that comprises an inorganic, nonmetal atom selected from the group consisting of sulfur, phosphorus, boron, and chlorine.

18. An oriented strand board having a length and a thickness, the oriented strand board comprising in order across the thickness of the oriented strand board:
a first layer comprising a plurality of first wood substrates that independently comprise a lignin-containing material and independently have a form selected from the group consisting of strand and flake, the plurality of first wood substrates being adhered together in a first orientation substantially parallel to the length of the oriented strand board with an adhesive that comprises a substituted cellulose ester that comprises a cellulose polymer backbone having an organic ester substituent and an inorganic ester substituent that comprises an inorganic, nonmetal atom selected from the group consisting of sulfur, phosphorus, boron, and chlorine;
a second layer comprising a plurality of second wood substrates that independently comprise the lignin-containing material and independently have the form selected from the group consisting of strand and flake, the plurality of second wood substrates being adhered together in a second orientation substantially perpendicular to the length of the oriented strand board with the adhesive; and
a third layer comprising a plurality of third wood substrates that independently comprise the lignin-containing material and independently have the form selected from the group consisting of strand and flake, the plurality of third wood substrates being adhered together in the first orientation with the adhesive.

19. An engineered wood comprising:
a plurality of wood substrates that independently comprise a lignin-containing material, the plurality of wood substrates being adhered together with an adhesive that comprises a substituted cellulose ester that is crosslinked, the substituted cellulose ester comprising a cellulose polymer backbone having an organic ester substituent and an inorganic ester substituent that comprises an inorganic, nonmetal atom selected from the group consisting of sulfur, phosphorus, boron, and chlorine.

* * * * *